No. 641,174. Patented Jan. 9, 1900.
T. WHITEHORN & H. N. BRADY.
CIGARETTE MOUTHPIECE MAKING MACHINE.
(Application filed Oct. 4, 1899.)

(No Model.) 4 Sheets—Sheet 1.

Witnesses
Chas H. Smith
J. Staib

Inventors
Thomas Whitehorn.
Henry N. Brady.
per L. W. Serrell & Son
attys

No. 641,174. Patented Jan. 9, 1900.
T. WHITEHORN & H. N. BRADY.
CIGARETTE MOUTHPIECE MAKING MACHINE.
(Application filed Oct. 4, 1899.)

(No Model.) 4 Sheets—Sheet 2.

Witnesses
Chas H. Smith
J. Staib

Inventors
Thomas Whitehorn
Henry N. Brady
per L. W. Serrell & Son
Attys

No. 641,174. Patented Jan. 9, 1900.
T. WHITEHORN & H. N. BRADY.
CIGARETTE MOUTHPIECE MAKING MACHINE.
(Application filed Oct. 4, 1899.)

(No Model.) 4 Sheets—Sheet 3.

Witnesses
Chas H Smith
J Staib

Inventors
Thomas Whitehorn
Henry N. Brady
per L. W. Serrell & Son
att'ys

No. 641,174. Patented Jan. 9, 1900.
T. WHITEHORN & H. N. BRADY.
CIGARETTE MOUTHPIECE MAKING MACHINE.
(Application filed Oct. 4, 1899.)
(No Model.) 4 Sheets—Sheet 4.
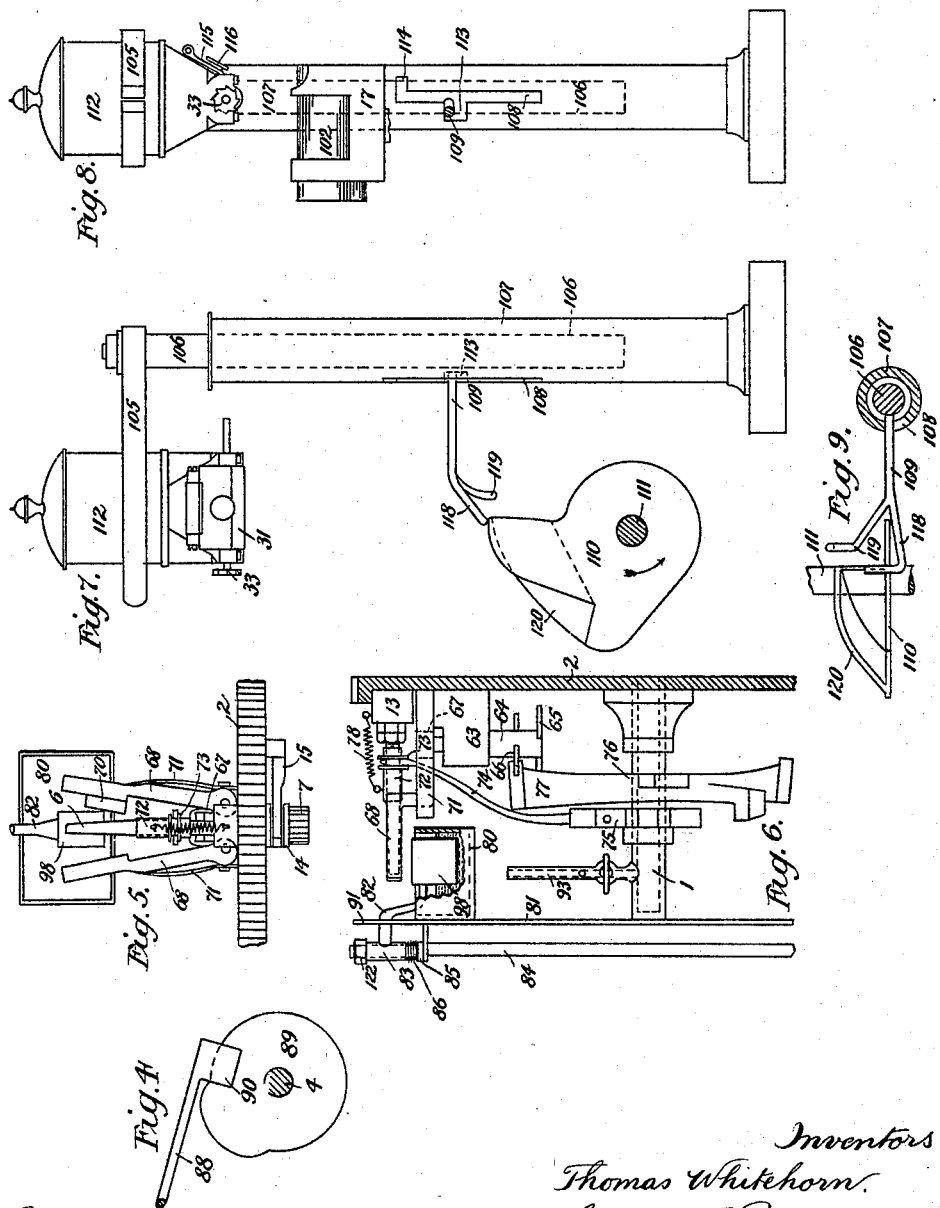
Witnesses
Chas H Smith
J. Staib
Inventors
Thomas Whitehorn
Henry N. Brady
per L. W. Sewell & Son
attys

UNITED STATES PATENT OFFICE.

THOMAS WHITEHORN AND HENRY NICHOLSON BRADY, OF MELBOURNE, VICTORIA.

CIGARETTE-MOUTHPIECE-MAKING MACHINE.

SPECIFICATION forming part of Letters Patent No. 641,174, dated January 9, 1900.

Application filed October 4, 1899. Serial No. 732,445. (No model.)

*To all whom it may concern:*

Be it known that we, THOMAS WHITEHORN and HENRY NICHOLSON BRADY, subjects of the Queen of Great Britain, and residents of No. 132 Flinders Lane, Melbourne, in the Colony of Victoria, Australia, have invented certain new and useful Improvements in Cigarette-Mouthpiece-Making Machines, of which the following is a specification.

This invention has been devised for the purpose of providing improved mechanism or apparatus to be used in manufacturing mouthpieces for cigarettes and also for coating such mouthpieces, when being so made, with a covering of paraffin.

In order to make the invention clear, in describing same we will make reference to the accompanying drawings, in which—

Figure 1:
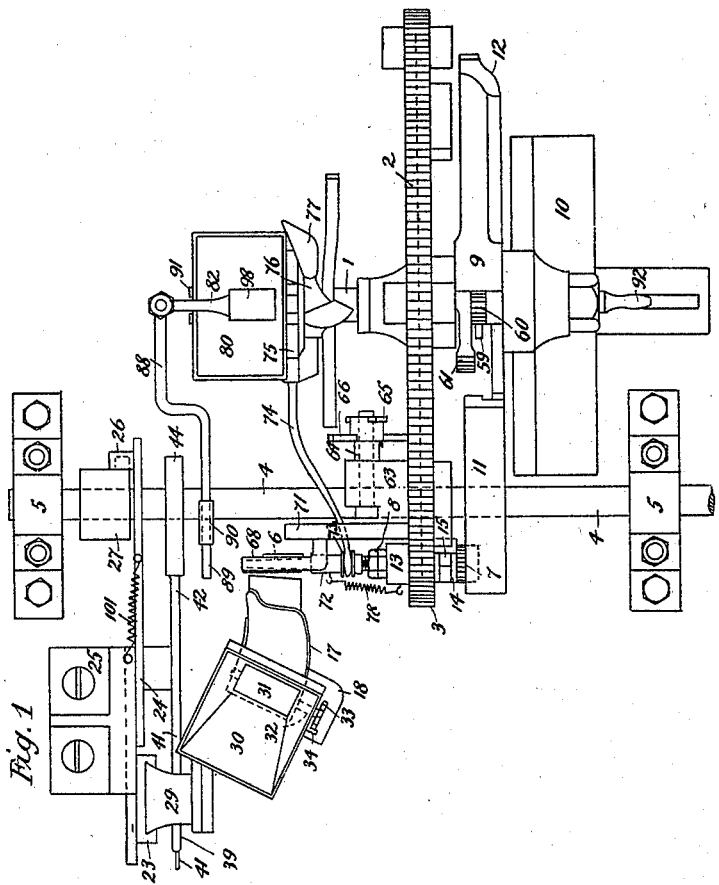
Figure 2:
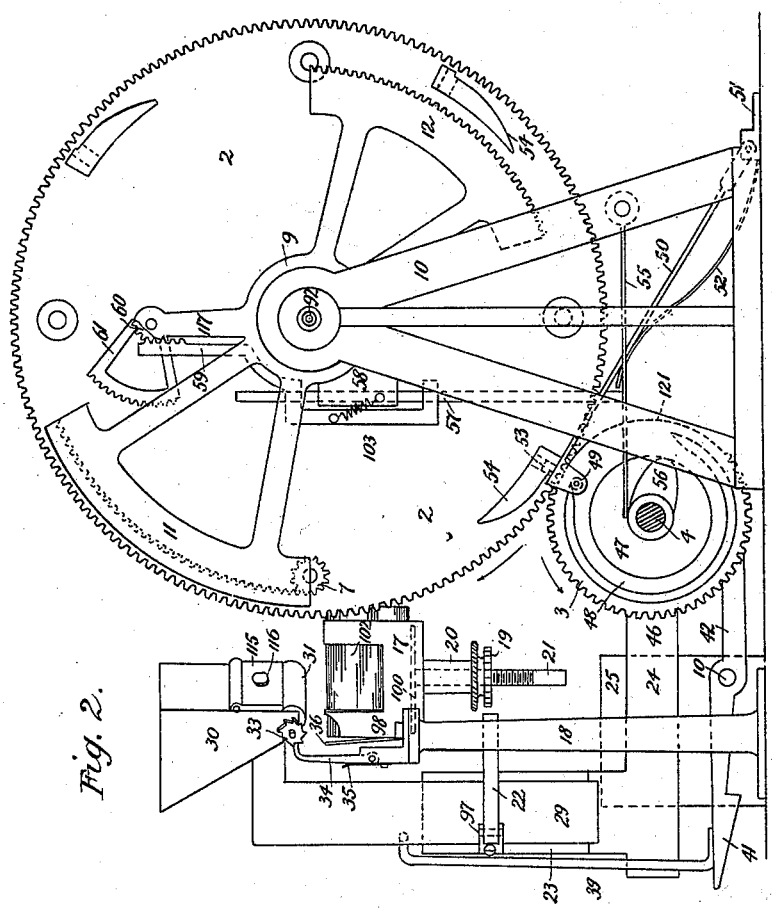
Figure 3:
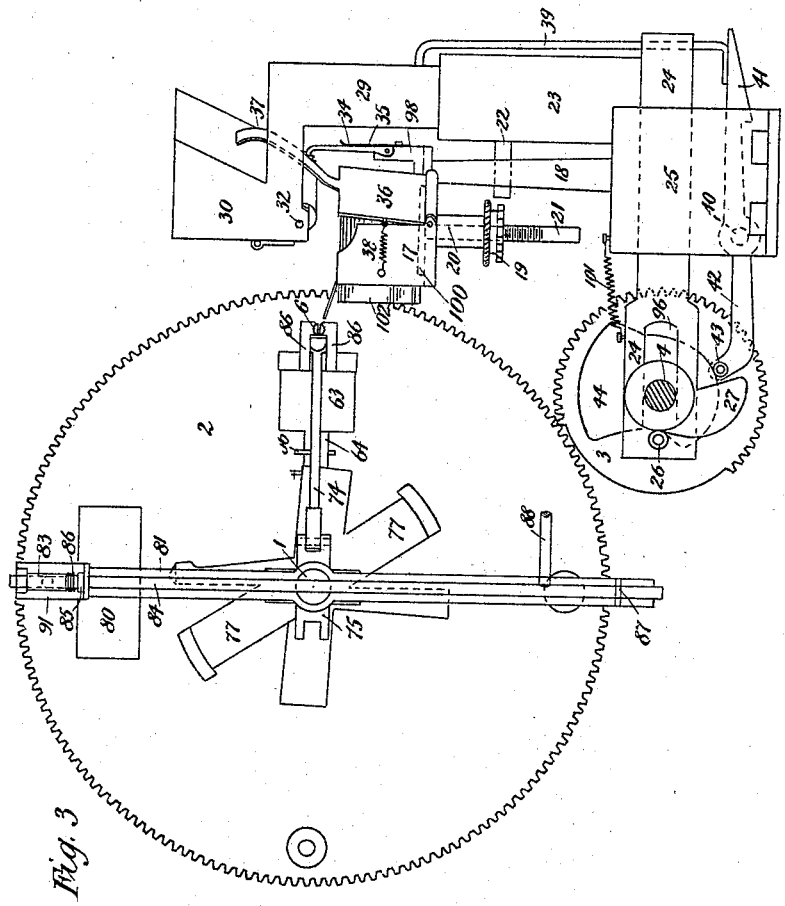

Figure 1 shows a plan of the machine; Fig. 2, a back elevation; Fig. 3, a front elevation. Fig. 4 shows cam for lifting rod carrying paraffin-pad; Fig. 5, a plan view showing mandrel in position when mouthpiece is about to be coated with paraffin. Fig. 6 is a side view of these with other adjacent parts of the machine. Figs. 7 and 8 show side and front views, respectively, of modified means of operating gum-box containing the adhesive-roller. Fig. 9 shows plan of portion of part shown in Fig. 7.

Upon a central stationary spindle or shaft 1, having bearing in frame 10, is mounted a circular plate or disk 2, provided with teeth at its periphery, such circular disk 2 being driven by a correspondingly-toothed wheel 3, but the teeth of which are interrupted by a plain portion 121 on the periphery. This wheel gears with the disk 2 and is set upon a shaft 4, set in suitable bearing-blocks 5 5, Fig. 1, and receives its rotary motion from any convenient source, such as from a pulley-wheel set on it or by means of a crank-handle. Upon the toothed disk 2 and near its circumferential line is arranged a mandrel 6. The mandrel 6 has a tapered shank and is provided with an incut or slit for the reception of the tongue or lip of the piece of paper to be twisted into the mouthpiece. The mandrel passes through a circular hole formed in the disk 2 and which has flanges 13 14, Fig. 1, encircling it. The back of the mandrel carries a small toothed pinion-wheel 7. Locknuts or stops are provided at 8 on the mandrel. The small toothed pinion-wheel 7 is arranged to recceive rotary motion from segmental frame 9, which is fixed to the standard 10. The segmental frame 9 has a portion 11 with internal teeth and a portion 12 with external teeth. The flange 14, Figs. 1 and 5, has a slot in its periphery, and a spring 15, affixed to the disk 2, bears in the said slot and presses against the mandrel to prevent its turning except under pressure.

17 represents a holder for the paper blanks which are to be made into the mouthpieces. This holder in plan corresponds in form with the shape of the paper blanks and is supported by a standard 18. The holder is provided with a false bottom 100, Fig. 2, which is arranged to move upwardly during the operation of the machine, so as to maintain the paper blanks at a constant level. This is effected by means of a screw-rod 21, fixed to the false-bottom plate and which passes through a sleeve 20, attached to the bottom of holder 17. The sleeve supports a ratchet-wheel 19, which is turned by spring-pawl 22, which is pivoted to an arm 97, Fig. 2, projecting from a sliding frame 23. This sliding frame is of L shape, the horizontal limb 24 of which slides in a dovetailed recess formed in a fixed block 25 and has a slot 96, Fig. 3, which encircles shaft 4. A pin or roller 26 is affixed near the end of the frame 24 and is arranged to ride upon cam 27, set upon the shaft 4. A spring 101 is affixed at one end to the frame 24 and at the other end to the fixed block 25 and serves to return the L-frame against the action of the cam 27. The frame 23 has a dovetailed slot, in which a vertical plate 29 slides. This plate 29 is bent into suitable form and carries receptacle 30, which is arranged to hold gum or other suitable adhesive substance. This box is tapered toward its bottom and which is closed in by a roller 31. This roller is set upon a spindle 32, Fig. 3, having bearings in the sides of the receptacle 30, and said spindle carries a small ratchet-wheel 33. A pawl 34 is pivoted to plate 98, supported by standard 18. Said pawl engages with the ratchet-wheel, so as to turn the roller. A spring 35 is set at the back of the pawl. The front of the receptacle 30 has a hinged plate 115 and a thumb-screw 116 for adjusting the pressure of same against roller to regulate the flow of gum. The box 17 aforesaid has its back plate 36 hinged at the bottom to the box and carries an arm 37, Fig. 3, which projects upwardly. The box 30 in its movement (hereinafter described) comes in contact with the said arm 37, so as to turn the back plate on its hinge and so release its pressure from the paper blanks 102 and make room for the roller. A spiral spring 38 is connected at one end to the side of box 17 and at the other end to back plate 36 to return same when pressure is released. Vertical motion is given to the plate 29, Fig. 3, and box 30 by means of a rod 39, connected with it (see Fig. 2) and passing down to a rocking lever, which latter is pivoted at 40 to fixed block 25. The rod 39 engages with and slides upon the arm 41 of said lever. The opposite arm 42 terminates with roller 43, which rides upon a cam 44, set upon the shaft 4.

The toothed wheel 3 aforesaid has an annular rim 46, Fig. 2, upon it, which extends about two-thirds around it and forms with the central portion 47 a groove 48, the edges of the said rim 46 being tapered off. A roller 49, set at the end of plate 50, is arranged to enter and travel through the said groove. This plate 50 is pivoted at its bottom to fixed frame 51 and has a spring 52 set beneath it to exert an upward pressure. At the top of the plate 50 a pin 53, Fig. 2, is set and projects upwardly and is arranged to enter a hole formed in tapered strip 54, (four of which are set upon the disk 2 at its back.) The strips 54, with the plate 50, serve to lock and hold the disk while the wheel 3 is out of gear with the toothed disk 2. An arm 55, Fig. 2, is pivoted to the framing 10, its other end engaging with cam 56 on shaft 4. A rod 57 rests upon the said arm 55. This rod works in fixed guide 58 and carries bent frame terminating in rack-bar 59. This rack-bar is arranged to engage with pinion 60, having bearing in standard 117. The pinion 60 is intimately connected with toothed segment 61, and which is arranged to gear with pinion 7, as hereinafter described. A spring 103 is provided to return the parts after action.

To the front of the disk is secured a block 63, Figs. 1 and 6, which forms a bearing for a spindle 64, which has at one end spokes or radial arms 65 66, the other end being provided with a head or block 67, which lies between the backing plates or arms 68 68, pivoted to the top of block 63, Figs. 5 and 6. A portion of the inside faces of these arms is curved, and they are arranged when closed to encircle the tapered portion of the mandrel 6. There will be upon the disk 2 a block 63 and connected parts for each mandrel 6. A plate 70, Fig. 5, is secured to the side of one of these arms 68 and overlaps the other arm when closed and forms a guide for the paper blank entering the mandrel. Springs 71 are arranged to impinge against the backing plates or arms 68. The block 67 aforesaid is of more or less elliptical form, so that when the spindle is turned said block will open the arms. Upon the mandrel is mounted a sleeve 72, which has a recess formed by flanges 73. This recess receives the bifurcated end of a bent arm 74, Figs. 5 and 6. This arm is received by and pivoted in a socket-piece 75, which is loose upon the shaft 1. A hub 76, provided with radial arms 77, is fixed to the shaft 1, and which serves a double purpose—namely, to turn the spindle 64 as the spokes 65 66 come into contact with it and so open the arms 68 and cause the bent arm 74 to turn outwardly upon its pivoted end as the said arm rides over the inclined faces of the arms 77. The bent arm will thus move the sleeve forward on its mandrel, the return of same being provided for by spring 78, connected at one end to the said sleeve and at the other end to the flange 13.

It is to be understood that the arms 77 are stationary and that their outer curved ends are in the path described by the spokes 65 66 of the spindle 64 as said spindle is carried around by the disk 2 and that when one of said spokes is brought in contact with one of the arms 77 it rides over the curved surface of said arm, and thereby a partial revolution is given to the spindle 64 to open the arms 68, as hereinafter set forth.

80 represents a receptacle which holds paraffin. This receptacle is supported by plate 81, secured at the end of shaft 1. A pad 98 is set within the box, being supported by an arm 82, projected from sleeve 83, set upon rod 84. A stop-collar 85 is set upon rod 84 beneath the sleeve, and a small spiral spring 86 intervenes between the said sleeve and collar, the sleeve being held by a nut 122. The rod passes down through hole in guide-frame at 87. A branch rod 88 projects from said rod 84 and is arranged to ride upon cam 89, Fig. 4, which latter is set upon the shaft 4. The end of the rod 88 is provided with suitable means to enable it to ride upon the cam, such as a bent plate 90. The box 80 is provided with guide-plates 91 for the arm 82 as it rises with the rod 84.

The shaft 1 is made hollow, Fig. 6, and is provided at its end with a connection-piece 92, Fig. 1, for gas-tubing, or it may be connected with a gas-pipe. A bunsen 93, Fig. 6, is connected with hollow shaft 1 and is provided for the purpose of heating the paraffin in the receptacle 80.

In the drawings we have for the sake of clearness shown one mandrel only; but the machine illustrated is adapted to carry and operate four. The feeding mechanism also would be in duplicate to feed a mandrel in position on disk opposite to that shown, Figs. 1 and 2.

The *modus operandi* of the invention is as follows, (the operation of one mandrel only being described, the others being analogous and synchronous in action:) Assume the machine to be in position shown on Figs. 1, 2, and 3. When in this position, the box 30 will have descended and its gummed roller 31 will have picked up a paper blank, and on the further rotary motion of the shaft 4 in the direction indicated by arrow, Fig. 2, the box 30 will be moved forward as the cam 27 on shaft 4 forces out the pin 26 on the frame 24. The paper blank will thus be fed to the mandrel 6, the mandrel being in the meantime retained in its position by the pin 53 on the plate 50 entering hole in 54 and which prevents the disk from turning, the gear-wheel 3 meanwhile rotating out of gear with the disk 2. The beveled edge of rim 46 will come in contact with roller 49, so depressing it and withdrawing the pin 53 from its hole, when the disk will be free to rotate, and the toothed portion of the wheel 3 will again meet the teeth of disk 2, and thus cause it to rotate. At the same time the pinion 7 on the mandrel will meet the teeth of the fixed segmental frame 11, so causing the mandrel to rotate and to wind the paper blank upon it into the desired form. The paper which has had its edge gummed by the roller will be retained in the tubular tapered mouthpiece form. On the further rotation of the disk 2 an arm 66, Fig. 6, on the spindle 64 will meet the curved surface of arm 77, so causing the spindle 64 to turn and the head 67 to open the arms 68. The mandrel will have now reached a position directly above the pad 98, Fig. 5, and the next block 54, reaching the pin 53, will now hold the disk with the mandrel in this position. The wheel 3 will now be again out of gear with the disk 2, and on further rotation of the shaft 4 the cam 56 will operate to raise the bar 55, so as to elevate the rod 57 and cause the rack 59 to turn the segment 61 and bring it into gear with the small pinion 7, so as to turn the mandrel; but while this is taking place the cam 89, Fig. 4, will have been turned, so as to raise the rod 84, Fig. 3, to cause the paraffin-pad to press upon the mandrel. The paper tube will thus have its end coated with paraffin. After this operation the wheel 3 will again gear with the disk 2, so as to further turn it and so cause the spindle 64, Fig. 6, to be further turned as its arm 66 moves over 77, and the head 67 will turn, so as to allow the arms 68 to move toward each other. At the same time the bent arm 74 will ride over an inclined face of one of the arms of block 76, so as to move the sleeve 72 outwardly and throw off the mouthpiece now finished, and the spring 78 will cause the sleeve to be returned to its normal position. The arms 68 will close upon the mandrel, which will now have reached a position to again receive a paper blank from the duplicate feeding mechanism, (not shown,) and the operation of making a mouthpiece will be repeated.

We may alternatively construct the gum-box as shown, Figs. 7 and 8, it being in this arrangement supported by arms 105, secured upon a vertical spindle 106, having bearing in standard 107. The standard has a slot 108 in it, and a pin 109 upon the spindle 106 projects through the said slot, and is arranged to be operated by cam 110 upon shaft 111, the said shaft being actuated from any moving part of the machinery convenient for the purpose. The pin 109 is divided and the divided ends 118 119 are arranged to travel upon the cam, which has two ways, formed one by the main plate 110, the other by plate 120, secured thereto.

In operation, assuming the cam to be in the position shown, Figs. 7 and 9, on rotation of the shaft 111 in direction indicated by arrow, Fig. 7, the cam will be disengaged from 118. A spring set in any convenient position for the purpose will cause the spindle to turn and pin 109 to move in slot 113, so as to descend in slot 108, and box 112 will fall to pick up a paper blank. The end 119 of the pin 109 will now ride upon the cam and along the plate 120, during which time it will again turn the pin 109 into slot 113, the roller meantime feeding the mandrel with the paper it has previously picked up. The end 118 will now ride upon plate 110, and pin and spindle will again fall and the roller 31 will pick up a fresh sheet.

The slot 108 is extended upwardly and has cross-slot 114, the object of this extension being that an operator may elevate the box and by turning the spindle cause the pin 109 to be held in slot 114, during which time he may refill the box 17 with paper blanks 102.

Having now particularly described and ascertained the nature of our said invention and in what manner the same is to be performed, we declare that what we claim is—

1. In a machine for making cigarette-mouthpieces, the combination of a toothed disk and a shaft on which the same is mounted, a mandrel upon which the tube is formed mounted on said disk in a plane at right angles to said disk, a pinion upon said mandrel, a stationary toothed segment supported by the frame of the machine for rotating the mandrel, and means for giving said toothed disk an intermittent motion, substantially as specified.

2. The combination with the toothed disk 2 and the shaft upon which the same is mounted, of a mandrel 6 fitted to turn in said disk, a pinion on said mandrel, means for temporarily locking the disk, and means for turning the mandrel while the disk is locked, substantially as specified.

3. The combination with the toothed disk 2 and the shaft upon which the same is mounted, a toothed mandrel 6 fitted to turn in said disk and means for rotating the mandrel and disk, of the arms 68 pivoted to said disk, springs to press the outer ends of said arms against the paper as wound upon said mandrel, a sleeve 72 fitted to slide upon the mandrel 6 and means for actuating said sleeve to eject the tube from the mandrel, substantially as specified.

4. The combination with the toothed disk 2, and the shaft upon which it is mounted, a toothed mandrel carried by said disk and means for rotating said mandrel, of a receptacle containing paraffin, a rod 84 suitably supported, an absorbent pad 98, and an arm 82 connecting the pad to said rod 84, said pad being within the paraffin-receptacle, and means for raising said rod and pad so as to apply the paraffin to the tube on the mandrel at the time the mandrel 6 is immediately over said pad, substantially as specified.

5. The combination with the disk 2 and its shaft a toothed mandrel carried by said disk, and means for rotating said mandrel, of the holder 17 containing the paper blanks, a standard 18 for supporting said holder, means for maintaining said paper blanks at a constant level, a receptacle 30 for holding an adhesive material, a roller at the bottom of said receptacle, means for rotating said roller, means for lowering the receptacle and roller so that the roller is brought into contact with the top blank in the holder 17, and means for carrying the receptacle, roller and blank forward so as to present the blank to the mandrel upon which it is to be wound, substantially as specified.

6. The combination with the toothed disk 2 and its shaft, a mandrel carried by said disk, a pinion upon said mandrel, the mutilated gear 3 and its shaft 4 for turning said disk 2, of the pivoted toothed segment 61 and pinion 60, the rod 57 having a rack 59 at its upper end, the pivoted arm 55 upon which the lower end of said rod rests, and a cam 56 on the shaft 4 for lifting said rod, substantially as specified.

7. The combination with the toothed disk 2, and its shaft, means for giving the disk an intermittent motion, and a toothed mandrel 6 carried by said disk, of the pivoted backing plates or arms 68, the spindle 64 having a head 67 at one end between said arms and radial arms 65 66 at its opposite end, the hub or block 76 secured to the shaft 1, and having arms 77 which engage the radial arms 65 66 at the proper time and turn the spindle 64 and head 67 so as to open the arms 68, substantially as specified.

8. The combination with the toothed disk 2 and its shaft 1, a toothed mandrel carried by said disk, and means for giving said disk an intermittent motion, of the pivoted arms 68, the spindle 64 having a head 67 at one end between said arms and radial arms 65 66 at its opposite end, the hub or block 76 secured to said shaft 1 having arms 77 which engage the arms 65 66 at the proper time and turn the spindle 64, a sleeve 72 upon the mandrel 6, a block 75 loose on the shaft 1, and a lever 74 pivoted to said block 75, said lever 74 being actuated by the arm 77 to move the sleeve 72 and eject the tube from the mandrel at the time the jaws 68 are open, substantially as specified.

9. The combination with the toothed disk 2 and its shaft, a toothed mandrel carried by said disk, and means for rotating said mandrel, of the mutilated gear 3 having a flange or rim 46 upon its face, the tapering strip 54 having a hole in it and secured to the disk 2, the pivoted plate 50 having a roller 49 and a pin 53 at its free end, and a spring to press the free end of said plate in the direction of the axis of the disk 2, so that when in the rotation of the gear 3, the roller 49 passes off the inner face of the flange 46, the pin 53 enters the hole in the plate 54 and locks the toothed disk, substantially as specified.

10. The combination of the holder 17 for paper blanks, pivoted back plate 36 having an extension-arm 37, spring 38 for returning the back plate to its normal position, the screw-rod 21, the false-bottom plate 100 at the upper end of said rod 21, a sleeve 20 secured to the under side of the holder and through which sleeve the screw-rod passes, a ratchet-wheel at the lower end of said sleeve, and the side frame 23 and pawl 21 for actuating said ratchet and raising the rod 21, substantially as specified.

11. The combination of the receptacle 30, for adhesive material, a plate 29 for supporting said receptacle, a roller 31 at the bottom of said receptacle, a ratchet-wheel 33 on the roller-spindle, a pawl 34 to actuate the wheel 33 a rod 39 connected at its upper end to the plate 29, a rocking lever 41 42 upon one end of which the lower part of rod 39 rests, a cam 44 and its shaft 4 for acting upon the lever 41 42, the slide-plate 24, the cam 27 acting upon said slide-plate, and a spring 101 for returning the slide-plate and parts carried by it, substantially as specified.

Signed at Melbourne, in the Colony of Victoria, Australia, this 10th day of August, 1899.

THOMAS WHITEHORN.
HENRY NICHOLSON BRADY.

Witnesses:
A. O. SACHSE,
A. HARKER.